Patented Aug. 26, 1924. 1,506,575

UNITED STATES PATENT OFFICE.

LOUIS A. EBERHARDT, OF NEW YORK, N. Y.

MANUFACTURE OF RAT POISON.

No Drawing. Application filed December 11, 1922. Serial No. 606,253.

*To all whom it may concern:*

Be it known that I, LOUIS A. EBERHARDT, a citizen of the United States, residing at New York, in the county and State of New York, have invented certain new and useful Improvements in the Manufacture of Rat Poison, of which the following is a full, clear, and exact specification.

This invention relates to the preservation of plants, drugs, vegetables, meats, and the like, and particularly to preserving of the bulbs of squills (*Scilla maritima* or *Urginea maritima*) and other varieties of red squills.

It is the object of the invention to produce a preparation of rat poison from preserved squill bulbs.

Squill bulbs are considered by the U. S. Government and others to be the safest poisons for destroying rats and mice, but as these bulbs are grown almost exclusively in the region of the Mediterranean Sea, and they are very fleshy and slimy, so that they are hard to dry and are liable to deteriorate during shipment, it has been a serious problem to import them into this country. Moreover when the squill is dried it undergoes changes which diminish its activity. Then again, if the handling of fresh squill is not properly conducted, it causes itching on the hands. All these disadvantages are overcome by the present invention.

According to this invention the bulbs are pulled or cut from the earth, the dirt shaken off of them, and they are then placed in a non-changeable menstruum, preferably paraffin oil, although various purity oils, soft and hard paraffins may also be used. The bulbs may be cleaned mechanically or roughly prepared by cutting off the outer inert scales and rootlets, and the bulbs may also be cut into pieces or slices, if desired. The bulbs, either whole or in pieces, are covered with the paraffin oil, about 150 pounds of the oil being generally sufficient to cover 300 pounds of bulbs.

The paraffin oil and bulbs are then gradually heated, preferably in a suitable vessel, such as a steam jacketed kettle, until the air is expelled from the mass. The heating may be moderate, no high temperatures being necessary. A temperature of from 85 to 95° C. for a couple of hours is usually sufficient.

In some cases, when the bulbs are not fresh but still of use, a small quantity of salicylic acid, preferably about 0.1%, previously dissolved in hot paraffin oil, may be added before heating. If the bulbs are moldy but otherwise sound, oils of cloves or allspice (pimenta) may be added to check moldiness, about 5 drops to the pound. The salicylic acid, as well as the oils of cloves and allspice, do not interfere with the use of squills as rat poison, but on the contrary are helpful. Paraffin oils are also helpful in rat poisons.

The squill bulbs and paraffin oil, as packed at the place of gathering, can be cut up in a machine without coming in contact with the hands, and made into suitable form for the market, i. e., paste, cakes, pills, etc. The use of paraffin oils with the squills also enables the making of uniform preparations of rat poison which heretofore has been lacking at least with squills. Barium salts, also recommended by the U. S. Government, may also be added without interfering with the squills and paraffin. The packing of the squills in paraffin oil for shipment does away with detail manual handling, and the bulbs retain their active principles in substantially undiminished strength.

When the process is used for preserving drugs for medicinal use, the pure paraffin oil may be extracted by a suitable solvent, such as ether, chloroform, or the like, any of the known commercial processes being utilized.

I claim:—

1. A method of preparing rat poison, which consists in first immersing squill bulbs in paraffin oil, and then comminuting the bulbs and paraffin.

2. A rat poison containing squill bulbs and paraffin.

In testimony whereof I have signed my name to this specification.

LOUIS A. EBERHARDT.